United States Patent [19]
Hashimoto et al.

[11] 4,448,228
[45] May 15, 1984

[54] AIR BAG SYSTEM HAVING A BRANCHED JOINT

[75] Inventors: Nobuyuki Hashimoto, Toyota; Takemi Hattori, Kariya, both of Japan

[73] Assignee: Aisin Seiki Kabushiki Kaisha, Kariya, Japan

[21] Appl. No.: 335,524

[22] Filed: Dec. 29, 1981

[30] Foreign Application Priority Data

Jan. 10, 1981 [JP] Japan .............................. 56-1310[U]

[51] Int. Cl.³ .............................................. B65B 3/04
[52] U.S. Cl. .................................... 141/114; 141/236; 5/456; 138/178
[58] Field of Search ................. 141/10, 114, 234, 236; 5/449, 453, 455, 456; 138/177, 178; 222/331; 297/201, 204, 384

[56] References Cited

U.S. PATENT DOCUMENTS

| | | | |
|---|---|---|---|
| 2,136,510 | 11/1938 | Jensen | 137/223 |
| 3,111,968 | 11/1963 | Headrick | 141/236 |
| 3,326,601 | 6/1967 | Vanderbilt et al. | 297/204 |
| 3,363,941 | 1/1968 | Wierwille | 297/384 |

Primary Examiner—Houston S. Bell, Jr.
Attorney, Agent, or Firm—Burns, Doane, Swecker & Mathis

[57] ABSTRACT

An air bag system includes a plurality of inflatable air bags; an air source for supplying air to said air bags, a branched joint for distributing the air from said air source to said air bags; and check valves, each being provided between said joint and said air bags for allowing the air to flow to air bags from said joint, and openings of ports of said joint to branch pipes being changed in order of inflation of air bags.

1 Claim, 4 Drawing Figures

AIR BAG SYSTEM HAVING A BRANCHED JOINT

BACKGROUND

The present invention relates to an air bag system, in particular, to an air bag system including a plurality of air bags contained in an automobile seat to fit an occupant.

There has heretofore been an automobile seat back rest having a plurality of air bags contained therein which may be independently inflated to change the contour of the rest to fit an occupant. The air bags are deflated into a desired size and pressure one by one by the manipulation of a relief valve of each air bag after all the air bags have been fully inflated. Therefore, it requires a long period of time to adjust the pressure of the air bags until the seat back rest will achieve the occupant's desired contour. Namely, it takes much longer time because adjustment of air bags is delicate since the adjustment of one air bag will affect the feeling caused from the entire air bags.

Furthermore, a manual squeeze type pump has been usually used since it is simple and easy to operate. Such a squeeze type pump also requires a long period of time to fully inflate all the air bags.

Stillmore, the conventional air bag system has a disadvantage in that it is difficult to control the inflation order of air bags since the operation of check valves are not uniform due to the variation in pressure at which the check valves opens. Thus the air bags can not be inflated in an order preferred with respect to the feeling of the occupant's body or in an order beginning from a preferred position with respect to adjustment sequence, i.e., it would cause bad feeling it any portion to be finally of a low pressure would fully inflate first.

SUMMARY OF THE INVENTION

It is therefore an object of the present invention to provide an air bag system in which disadvantages aforementioned are overcome, namely, an air bag system such that air bags are successively inflated in a preferred order.

The object of the present invention is accomplished by a air bag system including air supply ports having diameters which are changed in accordance with the order of the air bag inflation.

Further and more specific objects and advantages of the present invention will become more apparent from the following detailed specification and drawings.

In the following, the present invention will be described by means of drawings which will serve to better illustration of the invention and not to limitation thereof.

DETAILED DESCRIPTION OF THE INVENTION

Figure 1:
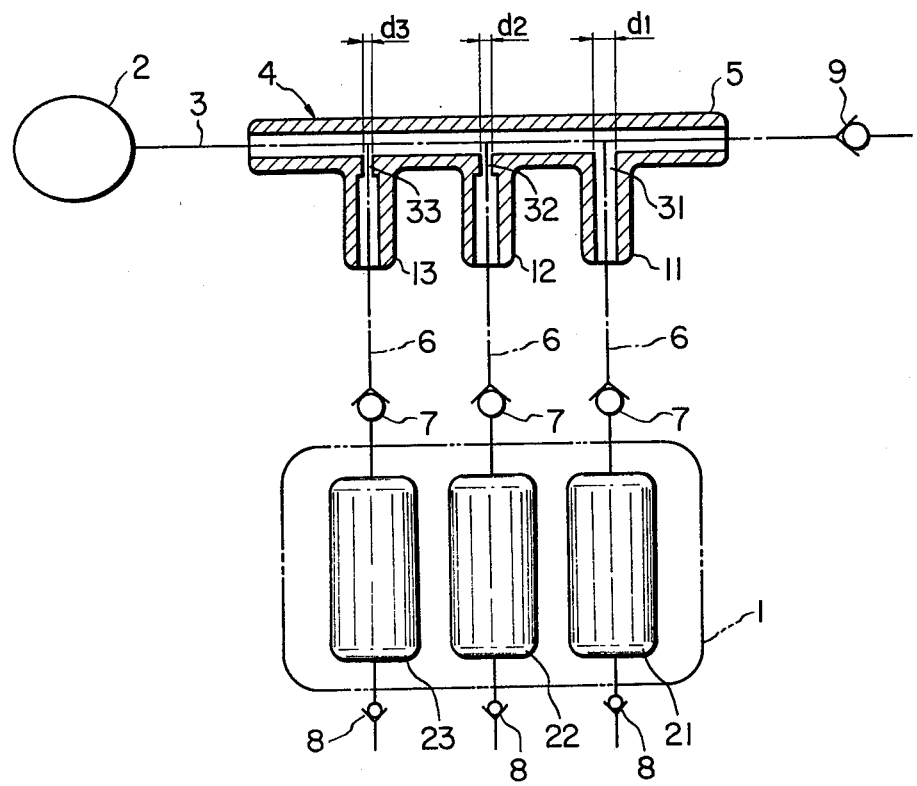
FIG. 1 is a diagramatic view showing an air bag system of the present invention.

Referring now to FIG. 1, there is shown an air bag system which is provided for the seat back rest 1 of an automobile. Alternatively the air bag system may be used for bed, air mattress etc.

An air source such as pump 2 (generally of the squeeze type) is communicated with a branched joint 4 through a pipe 3. A plurality (three in FIG. 1) of branch pipes 11, 12 and 13 which are connected to a main conduit 5 of the branched joint 4 are communicated with air bags 21, 22 and 23 respectively through pipes 6 and check valves 7. There are provided ports 31, 32 and 33 having diameters $d_1$, $d_2$ and $d_3$ ($d_1 > d_2 > d_3$) as shown in FIG. 1) so that different orifices are defined. The air bags 21, 22 and 23 are composed of an elastic material (for example rubber). There is shown three air bags 21, 22 and 23 in FIG. 1. Alternatively, provision of more number (for example 4 or 5) of air bags makes it possible to carry out fine adjustment of the seat back rest contour. Respective air bags 21, 22 and 23 are provided with a relief valve 8. The air in air bags 21, 22 and 23 may be discharged by depressing the knob of the relief valve 8 with a finger.

A relief valve 9 disposed on the main conduit 5 of the branched joint 4 is arranged so as to release the excessive pump discharge pressure in order to protect the air bag system.

Figure 2A:
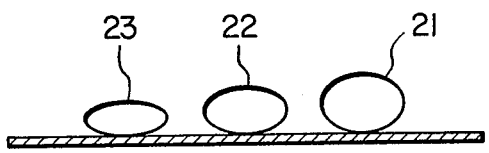
FIGS 2a–2c are a schematic views showing the sequence of inflation of air bags in accordance with the present invention.
Figure 2B:
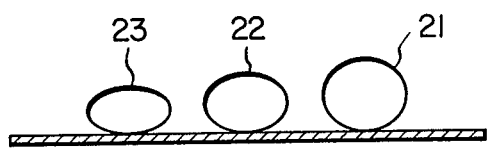
Figure 2C:
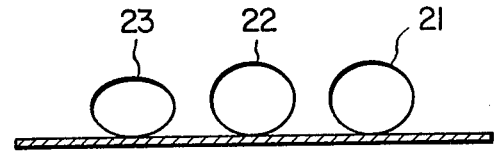

In operation, the passenger or occupant on the seat repeats to squeeze the pump 2 in order to supply air in a pulsated manner to respective air bags 21, 22 and 23 through the branched joint 4 and the check valve 7. The flow rates of the air through respective branch pipes 11, 12 and 13 are different from each other in accordance with the opening or diameters $d_1$, $d_2$ and $d_3$ of the inlet ports 31, 32 and 33 respectively. Accordingly, the air bags 21, 22 and 23 will successively reach a fully inflated condition in order of the opening or diameters of ports to which respective air bags 21, 22 and 23 communicate respectively as shown in FIGS. 2a to 2c. All the air bags 21, 22 and 23 begin to inflate as shown in FIG. 2a with the air bag 21 connected to the largest diameter port 31 inflating more rapidly. The air bag 21 is subsequently fully inflated as shown in FIG. 2b. Upon further introduction of air, the air bag 22 is subsequently fully inflated as shown in FIG. 2c. When the occupant feels uncomfortable due to excessive inflation of any air bag he may deflate any one of the air bag into a desired pressure or size by depressing the knob of a manual relief valve 8.

According to the present invention, inflation may be completed in a short period of time since the pressures in air bags simultaneously reach the desired pressures. For instance, an air bag in a position of the waist of the occupant is arranged so as to inflate first, i.e., the air bag 21. This enables the occupant to readily position his own body. The other air bags which are of no importance with respect of human enginnering are subsequently inflated. In other words, the air bag system of the present invention provides a desired contour of the seat back rest in a short period of time without giving uncomfortableness to the occupant.

The principles, preferred embodiment and mode of operation of the present invention have been described in the foregoing specification. However, the invention which is intended to be protected is not to be construed as limited to the particular embodiment disclosed. The embodiment is to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. An air bag system for a back rest comprising a plurality of inflatable air bags; an air source for supplying air to said air bags, a branched joint for distributing the air from said air source to said air bags; check valves, each being provided between said joint and said air bags for allowing the air to flow to the air bags; and openings of ports of said joint to branch pipes being different in cross-sectional area to regulate the order of inflation of the air bags; the area of the opening of the port for the at least one of the air bags against which the waist of an occupant rests being arranged such that said one of the air bags is fully inflated first.

* * * * *